US012663049B2

(12) United States Patent
Johansson

(10) Patent No.: US 12,663,049 B2
(45) Date of Patent: Jun. 23, 2026

(54) BRAKE DEVICE, INDUSTRIAL ROBOT AND METHOD

(71) Applicant: ABB Schweiz AG, Baden (CH)

(72) Inventor: Axel Johansson, Solna (SE)

(73) Assignee: ABB Schweiz AG, Baden (CH)

( * ) Notice: Subject to any disclaimer, the term of this patent is extended or adjusted under 35 U.S.C. 154(b) by 454 days.

(21) Appl. No.: 18/254,944

(22) PCT Filed: Dec. 7, 2020

(86) PCT No.: PCT/EP2020/084916
§ 371 (c)(1),
(2) Date: May 30, 2023

(87) PCT Pub. No.: WO2022/122116
PCT Pub. Date: Jun. 16, 2022

(65) Prior Publication Data
US 2024/0003392 A1      Jan. 4, 2024

(51) Int. Cl.
| | |
|---|---|
| *F16D 55/38* | (2006.01) |
| *B25J 19/00* | (2006.01) |
| *F16D 65/28* | (2006.01) |

(52) U.S. Cl.
CPC .......... *F16D 55/38* (2013.01); *B25J 19/0004* (2013.01); *F16D 65/28* (2013.01)

(58) Field of Classification Search
CPC ........ F16D 55/36; F16D 55/38; F16D 65/186; F16D 65/28; F16D 2055/0058; B25J 19/0004
See application file for complete search history.

(56) References Cited

U.S. PATENT DOCUMENTS

| | | | | |
|---|---|---|---|---|
| 5,639,804 A | * | 6/1997 | Yesnik | ................. F16D 69/026 |
| | | | | 523/156 |
| 10,596,712 B2 | | 3/2020 | Chiu et al. | |

(Continued)

FOREIGN PATENT DOCUMENTS

| | | |
|---|---|---|
| CN | 1678841 A | 10/2005 |
| CN | 102375401 A | 3/2012 |

(Continued)

OTHER PUBLICATIONS

International Search Report and Written Opinion of the International Searching Authority; Application No. PCT/EP2020/084916; Completed: Aug. 17, 2021; Mailing Date: Aug. 30, 2021; 17 Pages.

(Continued)

*Primary Examiner* — David R Morris
(74) *Attorney, Agent, or Firm* — Whitmyer IP Group LLC

(57) ABSTRACT

A brake device including a first device; a brake element having a first frictional brake surface and an engageable structure; a second device movable relative to the first device; a second frictional brake surface; a force device arranged to press the first frictional brake surface and the second frictional brake surface against each other with a pressing force; and an actuator connected to the first device, the actuator including an engaging structure movable between a disengaged position not engaging the engageable structure, and an engaged position engaging the engageable structure to brake relative motion between the first device and the second device; wherein a dynamic friction coefficient between the first frictional brake surface and the second frictional brake surface is less than 0.3, such as less than 0.15, or less than 0.1; and wherein the pressing force is dimensioned with respect to the dynamic friction coefficient.

19 Claims, 10 Drawing Sheets

(56) References Cited

U.S. PATENT DOCUMENTS

| | | | |
|---|---|---|---|
| 2018/0272545 A1 | 9/2018 | Haddadin et al. | |
| 2020/0331152 A1 | 10/2020 | Eriksson et al. | |

FOREIGN PATENT DOCUMENTS

| | | |
|---|---|---|
| CN | 108603549 B | 9/2019 |
| EP | 3423732 B1 | 10/2019 |
| GB | 1519846 A | 8/1978 |
| WO | 2017148499 A1 | 9/2017 |
| WO | 2019219886 A2 | 11/2019 |
| WO | 2019219886 A9 | 1/2020 |
| WO | 2019219886 A3 | 2/2020 |

OTHER PUBLICATIONS

International Preliminary Report on Patentability; Application No. PCT/EP2020/084916; Completed: Jun. 13, 2023; 11 Pages.
Chinese Office Action; Application No. 202080108372X; Issued: Sep. 24, 2025; 11 Pages.

* cited by examiner

BRAKE DEVICE, INDUSTRIAL ROBOT AND METHOD

TECHNICAL FIELD

The present disclosure generally relates to a brake device. In particular, a brake device, an industrial robot comprising a brake device, and a method of preparing a brake device, are provided.

BACKGROUND

An industrial robot may comprise a plurality of brake devices, for example one brake device in each joint. In some brake devices, such as disc brakes and band brakes, the friction force is proportional to the clamping force. This implies that a releasing force is required to overcome the clamping force to release the brake device. This releasing force is normally generated by a solenoid or other electric actuator which has to provide a high force for a given braking torque. As a result, the braking device has a high energy consumption, generates a lot of heat in a standby mode and tends to be large.

In order to provide a more effective braking, a pin brake may be used. A pin brake may comprise an actuator having an actuator pin selectively movable into and out from engagement with a brake disc forced against a brake surface. When the brake disc is engaged by the actuator pin, rotation of the brake disc is prevented, and frictional braking is effected between the brake disc and the brake surface. In this way, the normal force creating the friction force to generate a braking torque is decoupled from the actuator.

WO 2017148499 A1 discloses a multiple disc brake for an industrial robot, wherein the multiple disc brake includes a hub. The multiple disc brake includes at least one friction disc arranged to the hub such that it rotates with the motion of the hub, and a braking disc arranged freely rotatable to the hub. The braking disc has at least one brake protrusion protruding in a radial direction of the braking disc, and an actuating arrangement including an actuator and a stop member. The actuating arrangement is arranged to move the stop member such that the stop member and the at least one brake protrusion become engaged, whereby any rotational motion of the braking disc is halted, and a braking force is created by friction acting between the at least one friction disc and the braking disc.

Although pin brakes can be made more compact in comparison with brake devices where a releasing force is required to overcome the clamping force to release the brake device, pin brakes are sensitive to ingress of oil, grease and other friction reducing substances. For example, grease can evaporate from a gearbox adjacent to the brake device in an industrial robot and end up on the friction materials of the brake device. In this case, the braking torque generated by the brake device may be drastically reduced and the brake device may not function as planned. There are also many other circumstances that might contribute to an introduction of friction reducing substances to the friction materials of the brake device. This is a serious safety concern. Design efforts can be made to reduce the ingress of friction reducing substances to the friction materials of the brake device. However, this will lead to a more complex, bulky and/or expensive design.

A further safety concern associated with pin brakes is that a high impact force may be generated between the actuator pin and the brake disc. This impact force may cause breakage of components of the brake device.

SUMMARY

One object of the present disclosure is to provide a brake device having a safe operation.

A further object of the present disclosure is to provide a brake device having a reliable operation.

A still further object of the present disclosure is to provide a brake device that is less sensitive to oil and grease.

A still further object of the present disclosure is to provide a brake device having reduced maintenance requirements.

A still further object of the present disclosure is to provide a brake device having a compact design.

A still further object of the present disclosure is to provide a brake device having a cost-effective design.

A still further object of the present disclosure is to provide a brake device having a simple design.

A still further object of the present disclosure is to provide a brake device that is suitable for use in high speed and high torque applications.

A still further object of the present disclosure is to provide a brake device solving several or all of the foregoing objects in combination.

A still further object of the present disclosure is to provide an industrial robot comprising a brake device, which industrial robot solves one, several or all of the foregoing objects.

A still further object of the present disclosure is to provide a method of preparing a brake device, which method solves one, several or all of the foregoing objects.

According to a first aspect, there is provided a brake device comprising a first device; a brake element having a first frictional brake surface and an engageable structure; a second device movable relative to the first device; a second frictional brake surface; a force device arranged to press the first frictional brake surface and the second frictional brake surface against each other with a pressing force; and an actuator connected to the first device, the actuator comprising an engaging structure movable between a disengaged position, where the engaging structure does not engage the engageable structure, and an engaged position, where the engaging structure engages the engageable structure to brake relative motion between the first device and the second device; wherein a dynamic friction coefficient between the first frictional brake surface and the second frictional brake surface is less than 0.3, such as less than 0.15, or less than 0.1; and wherein the pressing force is dimensioned with respect to the dynamic friction coefficient.

When the engaging structure adopts the disengaged position, the brake element moves together with the second device. In order to brake the second device, the engaging structure is moved to the engaged position. The brake element thereby becomes locked such that sliding occurs between the first frictional brake surface and the second frictional brake surface. The friction between the first frictional brake surface and the second frictional brake surface brakes the movement speed of the second device. When the engaging structure adopts the engaged position, relative movement between the brake element and the first device is prevented. The brake device may be used for both static and dynamic braking of the second device.

Furthermore, since the force device is arranged to press the first frictional brake surface and the second frictional brake surface against each other, and the engaging structure is moved by the actuator to the engaged position where the engaging structure engages the engageable structure to effect braking, a normal force creating the friction force (e.g., to generate a braking torque) is decoupled from the actuator. The brake device therefore provides an effective braking.

The pressing force causes a contact interface between the first frictional brake surface and the second frictional brake surface to be clamped. The force device thus compresses the brake element such that the second frictional brake surface is forced against the first frictional brake surface. The force device may be pre-tensioned to provide the pressing force.

The brake device may further comprise a brake member, such as a friction disc. The brake member may comprise the second frictional brake surface. The second device may comprise the brake member. That is, the second device may comprise the second frictional brake surface.

The second device may comprise the force device. Alternatively, the force device may be external to the second device.

The first device may adopt various alternative configurations. The first device may comprise a support for the actuator. The first device may be fixed to, or constituted by, a first link of a joint of an industrial robot and the second device may be fixed to a second link of the joint. In each case, the actuator is connected to the first device such that the engaging structure moves relative to the first device between the disengaged position and the engaged position.

In conventional frictional brake devices, the friction materials are selected to provide a high friction between the materials. In direct contrast, the brake device according to the first aspect is intentionally provided with a low dynamic friction coefficient between the first frictional brake surface and the second frictional brake surface, e.g. directly from production of the brake device. By means of the reduced dynamic friction coefficient in combination with the correspondingly increased pressing force, the brake device enables a reduced or eliminated change in braking force or braking torque when the first frictional brake surface and/or the second frictional brake surface is contaminated by oil, grease, or other lubricants from the surroundings of the brake device (e.g., from a nearby gearbox).

The low dynamic friction coefficient can be obtained by lubricating or impregnating the first frictional brake surface and/or the second frictional brake surface with oil, grease, graphite powder or similar friction reducing substances. In this case, one or more friction reducing substances may be sintered into the first frictional brake surface and/or the second frictional brake surface.

Alternatively, or in addition, the low dynamic friction coefficient can be obtained by material selection for the first frictional brake surface and the second frictional brake surface. The first frictional brake surface and/or the second frictional brake surface may for example be made of steel, bronze, Teflon®, nylon or plastic.

A static friction coefficient between the first frictional brake surface and the second frictional brake surface may be less than 0.3, such as less than 0.2. According to one specific example, each of the first frictional brake surface and the second frictional brake surface is made of oiled steel to provide a static friction coefficient of 0.15 and a dynamic friction coefficient of 0.081. The concept of intentionally providing a low dynamic friction coefficient between the first frictional brake surface and the second frictional brake surface would require an extremely large actuator, or would not even be possible, for brake devices where a releasing force is required to overcome the clamping force to release the brake device. The low dynamic friction coefficient requires a very high clamping force to provide a desired braking torque.

However, since the brake device according to the present disclosure comprises an actuator that is separated from the pressing force, the pressing force can be set very high without needing a corresponding increase in rating of the actuator. A very stiff spring can be used to press the first frictional brake surface and the second frictional brake surface together, e.g. when lubricated, at the same time as a very small actuator can be used to move the engaging structure between the disengaged position and the engaged position. The brake device thus utilizes a relatively high pressing force to generate a high normal force to compensate for the low dynamic friction coefficient. In this way, the brake device is made less sensitive to external oils or various other contaminations of the brake device having a lubricating effect.

The brake element, the force device, the first frictional brake surface and the second frictional brake surface may be arranged in a stack. In this case, the brake element may be clamped in the stack.

The actuator may be a power off actuator. That is, the actuator may require electric power to move the engaging structure to the disengaged position.

When the electric power ceases, the engaging structure automatically returns to the engaged position, e.g. by means of an actuator spring. The actuator may be a solenoid. The brake device may comprise a plurality of actuators, each configured to move an associated engaging structure between a disengaged position and an engaged position.

The brake device of the first aspect may comprise any feature of the brake device of the second aspect.

The brake device may further comprise a lubricant. In this case, the first frictional brake surface, the second frictional brake surface and the lubricant may be configured such that the dynamic friction coefficient changes less than 10%, such as less than 5%, such as less than 2%, in case the lubricant appears between the first frictional brake surface and the second frictional brake surface. The lubricant and the dynamic friction coefficient between the first frictional brake surface and the second frictional brake surface may be engineered such that the dynamic friction coefficient does not significantly change between a state where only a small amount of lubricant is present between the first frictional brake surface and the second frictional brake surface, and a state where a large amount of lubricant is present between the first frictional brake surface and the second frictional brake surface.

The second device may be rotatable relative to the first device about a rotation axis. In this case, the brake device may be configured to exert a target dynamic braking torque against relative rotation between the first frictional brake surface and the second frictional brake surface. In this case, the pressing force may also be dimensioned with respect to the target dynamic braking torque. For an industrial robot, the target dynamic braking torque may be set to 0.2 Nm to 10 Nm.

The force device may force the brake element in a direction parallel with the rotation axis. Alternatively, or in addition, the engaging structure may move between the disengaged position and the engaged position in a direction parallel with the rotation axis.

The engaging structure according to the present disclosure may be a pin. The pin may be substantially parallel with, or parallel with, the rotation axis. The second device according to the present disclosure may alternatively be linearly movable relative to the first device.

According to a second aspect, there is provided a brake device comprising a first device; a brake element having a first frictional brake surface and an engageable structure; a second device movable relative to the first device; a second frictional brake surface; a force device arranged to press the first frictional brake surface and the second frictional brake surface against each other; and an actuator connected to the first device, the actuator comprising an engaging structure movable between a disengaged position, where the engaging structure does not engage the engageable structure, and an engaged position, where the engaging structure engages the engageable structure to brake relative motion between the first device and the second device; wherein the engaging structure and/or the engageable structure is configured such that the engaging structure resiliently engages the engageable structure when the engaging structure adopts the engaged position.

For relatively low speeds between an engaging structure and an engageable structure in a prior art brake device, an impact force between these parts may not be a problem. However, for relatively high speeds, there is a risk that the engaging structure or the engageable structure is damaged by the impact force.

With the brake device according to the second aspect in contrast, the resiliency between the engaging structure and the engageable structure reduces a magnitude of the impact force between the engaging structure and the engageable structure. As a consequence, a risk of failure of the brake device is reduced. The brake device thereby constitutes a frictional brake device, e.g. of the pin brake type, made suitable for high speed and high torque applications.

The brake device has a cost effective and compact design at the same time as the brake device can be used in high demanding robotics application with high-speed motors and high brake torque requirements. The resilient engagement between the engaging structure and the engageable structure may be an elastic engagement.

The brake device of the second aspect may comprise any feature of the brake device of the first aspect.

The engageable structure may comprise one or more apertures contributing to the resilient engagement. By providing apertures in the engageable structure, the engageable structure is given flexibility and is allowed to flex elastically. An impact force and a contact load between the engaging structure and the engageable structure can thereby be reduced. In particular, a peak of an impact force can be heavily reduced when the engaging structure engages the engageable structure.

By means of the one or more apertures, the brake device can provide a reduction of the impact force between the engaging structure and the engageable structure with a very cost efficient and compact design. The flexibility of the engageable structure can be accurately calibrated by adjusting the geometry of the one or more apertures. Each aperture may be a cut-out from the brake element. Thus, the one or more apertures may be provided by cutting away material from the brake element. Also, a thickness of the brake element may be considered to provide a desired flexibility of the engageable structure.

The brake element may be formed from a single piece of material, e.g. a metal or an alloy. Alternatively, or in addition, the brake element may have a uniform thickness. Instead of, or in addition to, providing the one or more apertures, resiliency may be introduced to the engaging structure and/or to a support of the actuator.

The second device may be rotatable relative to the first device about a rotation axis.

Each aperture may be a slot extending substantially in a radial direction, or in a radial direction, with respect to the rotation axis.

The brake device may be configured such that the brake element can rotate at least 0.5 degrees about the rotation axis during the resilient engagement between the engaging structure and the engageable structure. The brake device may be configured such that the brake element can rotate at least 1 degree, such as 1.5 degrees, about the rotation axis during the resilient engagement between the engaging structure and the engageable structure.

For example, from an angular position of the brake element where the engaging structure contacts the engageable structure, the brake element can rotate at least 0.5 degrees, such as at least 1 degree, such as 1.5 degrees, about the rotation axis with only elastic deformation, and no plastic deformation, of the engageable structure.

The brake element according to the present disclosure may be flat, e.g. constituted by a disc. The brake element may be made of metal, such as steel. Alternatively, or in addition, the brake element may be annular and/or concentric with the rotation axis. The brake element may be star-shaped.

The brake device may comprise a primary friction disc and a secondary friction disc. In this case, the brake element may be sandwiched between the primary friction disc and the secondary friction disc. Also, the primary friction disc and the secondary friction disc may be arranged in the stack. The primary friction disc and the secondary friction disc may be annular and/or concentric with respect to the rotation axis. The primary friction disc and the secondary friction disc may either be rotatable relative to the second device, or may form part of the second device. In the former case, additional frictional interfaces are introduced in the brake device, for example between a primary locking disc of the second device and the primary friction disc, and between a secondary locking disc of the second device and the secondary friction disc.

The brake element may comprise a primary first frictional brake surface contacting a primary second frictional brake surface of the primary friction disc, and an opposite secondary first frictional brake surface contacting a secondary second frictional brake surface of the secondary friction disc. Each friction disc may be annular. Each friction disc may be concentric with the rotation axis and/or may lie in a respective plane perpendicular to the rotation axis.

The engageable structure according to the present disclosure may comprise one or more teeth. The teeth may extend in a radial direction (e.g., radially outwards) with respect to the rotation axis. In case the brake element is flat, each tooth may be arranged to flex in a plane of the brake element when colliding with the engaging structure. The one or more teeth may be defined by the apertures.

The brake element may comprise a plurality of engageable structures, for example three engageable structures. The more engageable structures that are provided, the smaller will a backlash be between the engaging structure and an engageable structure when the engaging structure adopts the engaged position.

Each engageable structure comprises two parallel teeth. In this case, the engageable structure may comprise three slots, such that the teeth are arranged between a first slot and a second slot, and a third slot is arranged between the two teeth. In this case, the first tooth may be hit from a first side by the engaging structure and the second tooth may be hit from a second side, opposite from the first side, by the engaging structure.

The force device according to the present disclosure may comprise a spring. The spring provides a pre-tension of the first frictional brake surface and the second frictional brake surface against each other. The spring may be deformed to provide the pressing force.

According to a third aspect, there is provided an industrial robot comprising a brake device according to the present disclosure.

According to a fourth aspect, there is provided a method of preparing a brake device, the method comprising providing a brake device comprising a brake element having a first frictional brake surface and an engageable structure; a second device movable relative to the first device; a second frictional brake surface; a force device arranged to press the first frictional brake surface and the second frictional brake surface against each other with a pressing force; and an actuator connected to the first device, the actuator comprising an engaging structure movable between a disengaged position, where the engaging structure does not engage the engageable structure, and an engaged position, where the engaging structure engages the engageable structure to brake relative motion between the first device and the second device; wherein a dynamic friction coefficient between the first frictional brake surface and the second frictional brake surface is less than 0.3, such as less than 0.15, or less than 0.1; and wherein the method further comprises dimensioning the pressing force based on the dynamic friction coefficient.

The second device may be rotatable relative to the first device about a rotation axis. In this case, the method may further comprise determining a target dynamic braking torque of the brake device; and dimensioning the pressing force based on the target dynamic braking torque.

The method may further comprise connecting the first device of the provided brake device to a base structure; and connecting the second device of the provided brake device to a driven member. The base structure and the driven member may be a first link and a second link of a common joint of an industrial robot.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
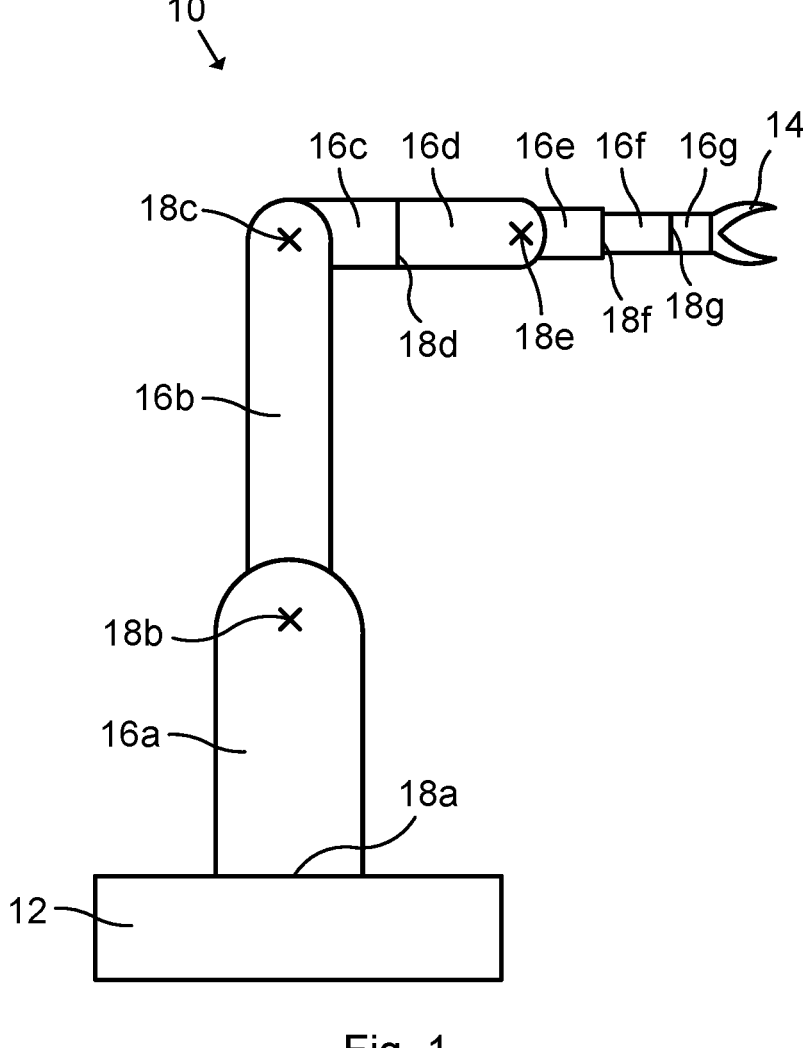
FIG. 1: schematically represents a side view of an industrial robot comprising a plurality of joints and a plurality of brake devices.

In the following, a brake device, an industrial robot comprising a brake device, and a method of preparing a brake device, will be described. The same or similar reference numerals will be used to denote the same or similar structural features.

FIG. 1 schematically represents a side view of an industrial robot 10. The industrial robot 10 is exemplified as a seven-axis industrial robot but the present disclosure is not limited to this type of robot. An industrial robot according to the present disclosure may comprise at least three axes.

The industrial robot 10 of this example comprises a base member 12 and an end effector 14. The industrial robot 10 further comprises a first link 16a distal of the base member 12 and rotatable around a vertical axis relative to the base member 12 at a first joint 18a, a second link 16b distal of the first link 16a and rotatable around a horizontal axis relative to the first link 16a at a second joint 18b, a third link 16c distal of the second link 16b and rotatable around a horizontal axis relative to the second link 16b at a third joint 18c, a fourth link 16d distal of the third link 16c and rotatable relative to the third link 16c at a fourth joint 18d, a fifth link 16e distal of the fourth link 16d and rotatable relative to the fourth link 16d at a fifth joint 18e, a sixth link 16f distal of the fifth link 16e and translationally movable relative to the fifth link 16e at a sixth joint 18f, and a seventh link 16g distal of the sixth link 16f and rotatable relative to the sixth link 16f at a seventh joint 18g. The seventh link 16g comprises an interface (not denoted) to which the end effector 14 is attached. A brake device according to the present disclosure may be provided at one, several or each of the joints 18a-18g.

Figure 2:
FIG. 2: schematically represents a perspective front view of a brake device.
Figure 3:
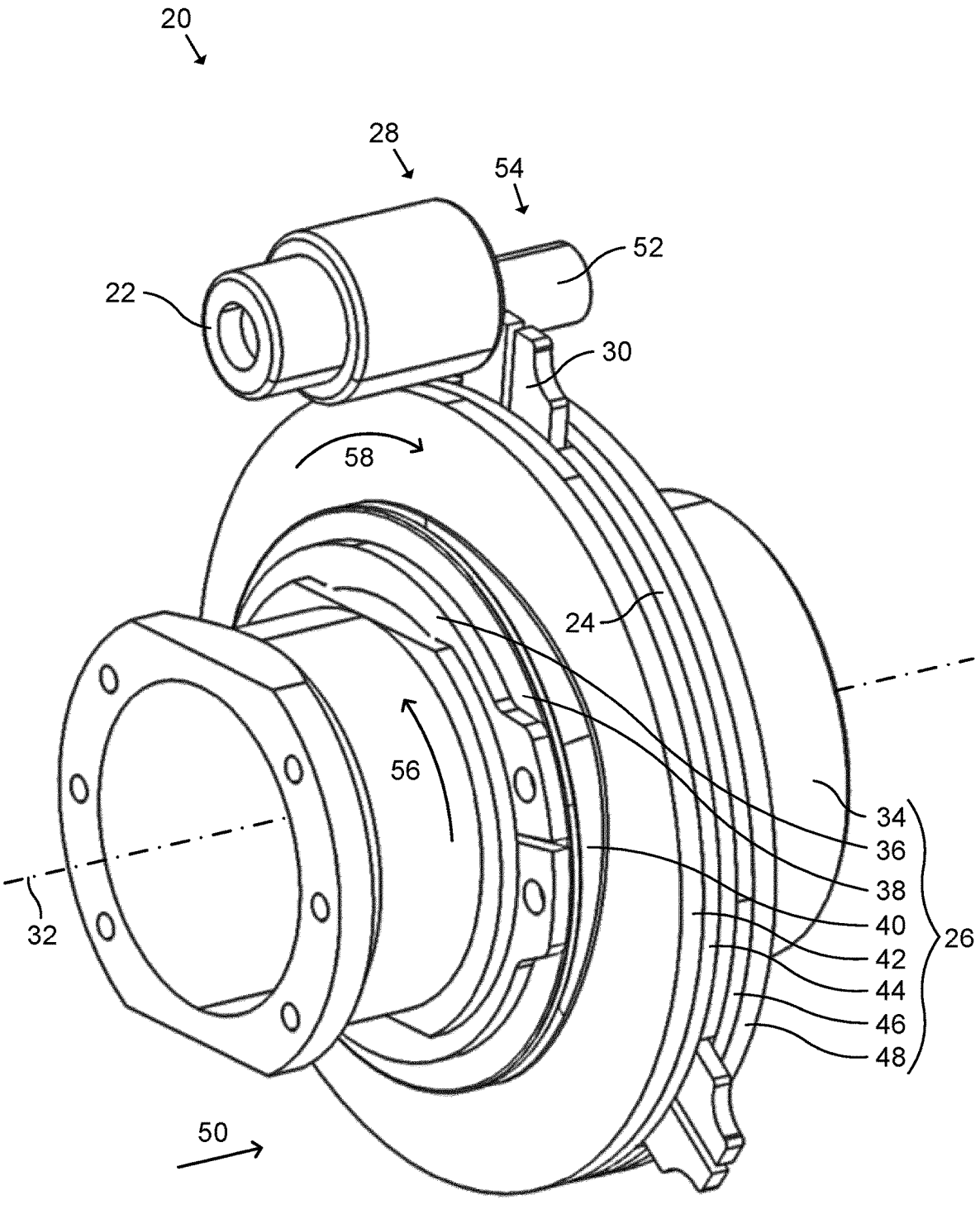
FIG. 3: schematically represents a perspective rear view of the brake device.

FIG. 2 schematically represents a perspective front view of a brake device 20, and FIG. 3 schematically represents a perspective rear view of the brake device 20. With collective reference to FIGS. 2 and 3, the brake device 20 comprises a first device 22, a brake element 24, a second device 26 and an actuator 28. The first device 22 and the second device 26 may for example be fixed to the first link 16a and the second link 16b, respectively, of the industrial robot 10.

The brake element 24 is here exemplified as a flat annular disc. The brake element 24 comprises a plurality of engageable structures 30, here three engageable structures 30.

The second device 26 and the brake element 24 are rotatable about a rotation axis 32. The second device 26 is rotatable about the rotation axis 32 relative to the first device 22.

The second device 26 of this example comprises an output shaft 34. The output shaft 34 is concentric with the rotation axis 32. The output shaft 34 of this example is hollow.

The second device 26 of this specific example further comprises, in order, a locking mechanism 36, a pressure washer 38, a force device 40, a primary locking disc 42, a primary friction disc 44, a secondary friction disc 46 and a secondary locking disc 48. Each of the locking mechanisms 36, the pressure washer 38, the force device 40, the primary locking disc 42, the primary friction disc 44, the secondary friction disc 46 and the secondary locking disc 48 is annular and provided around the output shaft 34. The primary friction disc 44 and the secondary friction disc 46 are examples of brake members according to the present disclosure.

The brake element 24 is sandwiched between the primary friction disc 44 and the secondary friction disc 46. The locking mechanism 36, the pressure washer 38, the force device 40, the primary locking disc 42, the primary friction disc 44, the brake element 24, the secondary friction disc 46 and the secondary locking disc 48 are compressed in a stack. The force device 40 provides a pressing force 50 to the stack such that the brake element 24 is clamped in the stack. The pressing force 50 can be adjusted and held by means of the locking mechanism 36 such that the stack is pre-tensioned.

The locking mechanism 36 is here exemplified as a circlip, but may alternatively be a starlock, a nut or similar. The pressure washer 38 provides an interface between the locking mechanism 36 and the force device 40.

The actuator 28 is connected to the first device 22. The actuator 28 comprises an actuator pin 52. The actuator pin 52 is one example of an engaging structure according to the present disclosure. The actuator pin 52 is movable relative to the first device 22 between an engaged position 54 as illustrated in FIGS. 2 and 3, and a disengaged position. The actuator pin 52 of this example is parallel with, and moves in a direction parallel with, the rotation axis 32. In the engaged position 54, the actuator pin 52 engages the engageable structure 30 such that a relative rotation 56 between the first device 22 and the second device 26 is frictionally braked. The brake device 20 provides a target dynamic braking torque 58, for example between 0.2 Nm and 10 Nm. The brake device 20 can provide very high braking torques with a very small actuator 28.

Figure 4:
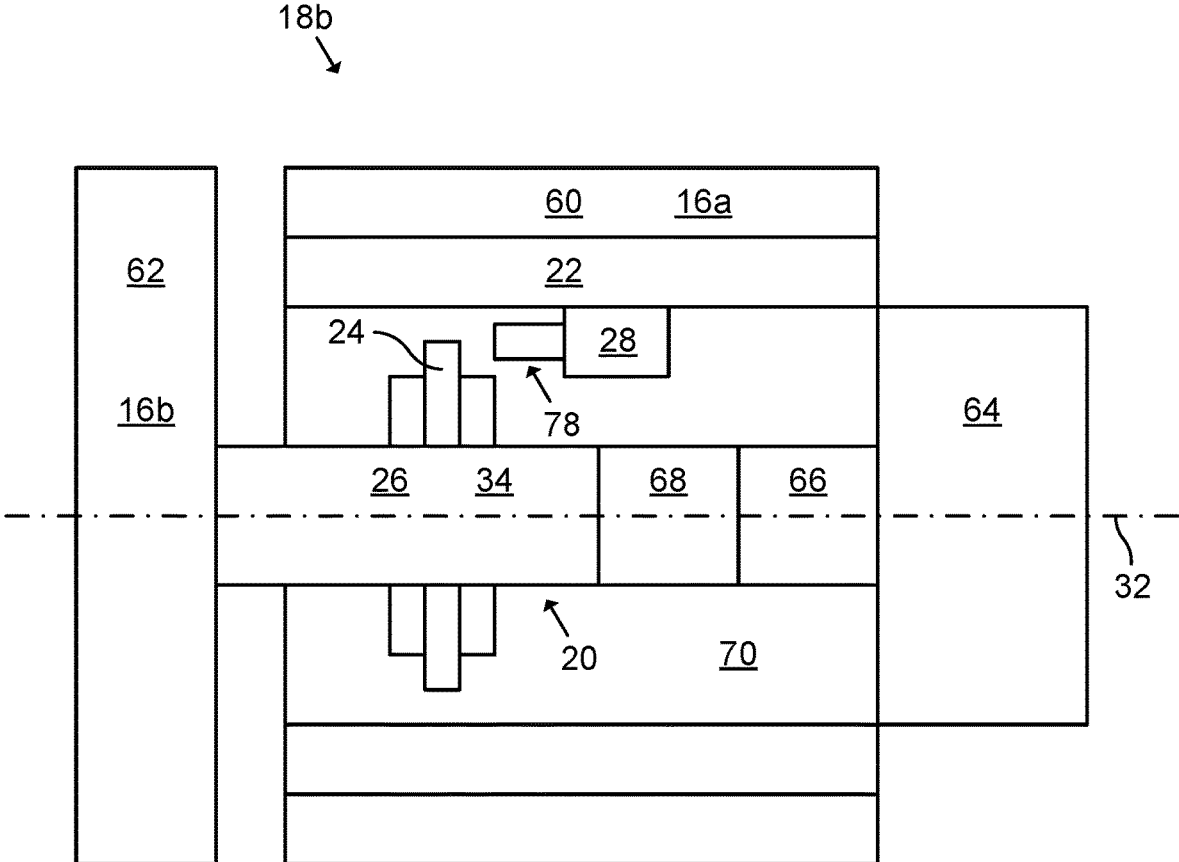
FIG. 4: schematically represents a cross-sectional side view of one of the joints in FIG. 1 comprising the brake device.

FIG. 4 schematically represents a cross-sectional side view of one of the joints in FIG. 1 comprising the brake device 20. In FIG. 4, the second joint 18b is exemplified. The first link 16a constitutes one example of a base structure 60 and the second link 16b constitutes one example of a driven member 62 according to the present disclosure. The first device 22 is fixed to the base structure 60 and the second device 26 is fixed to the driven member 62.

In addition to the brake device 20, the second joint 18b further comprises an electric motor 64 having a motor shaft 66, and a gearbox 68. The gearbox 68 transmits a rotation of the motor shaft 66 to a rotation of the output shaft 34 about the rotation axis 32. The motor shaft 66 may alternatively directly drive, or be integrally formed with, the output shaft 34. In this case, the gearbox 68 can be omitted. For a direct drive solution, the number of engageable structures 30 may be increased, e.g. to 20.

FIG. 4 further illustrates lubricant 70 present in the second joint 18b. However, entry of the lubricant 70 into the brake device 20 does not deteriorate its function as described below.

Figure 5:
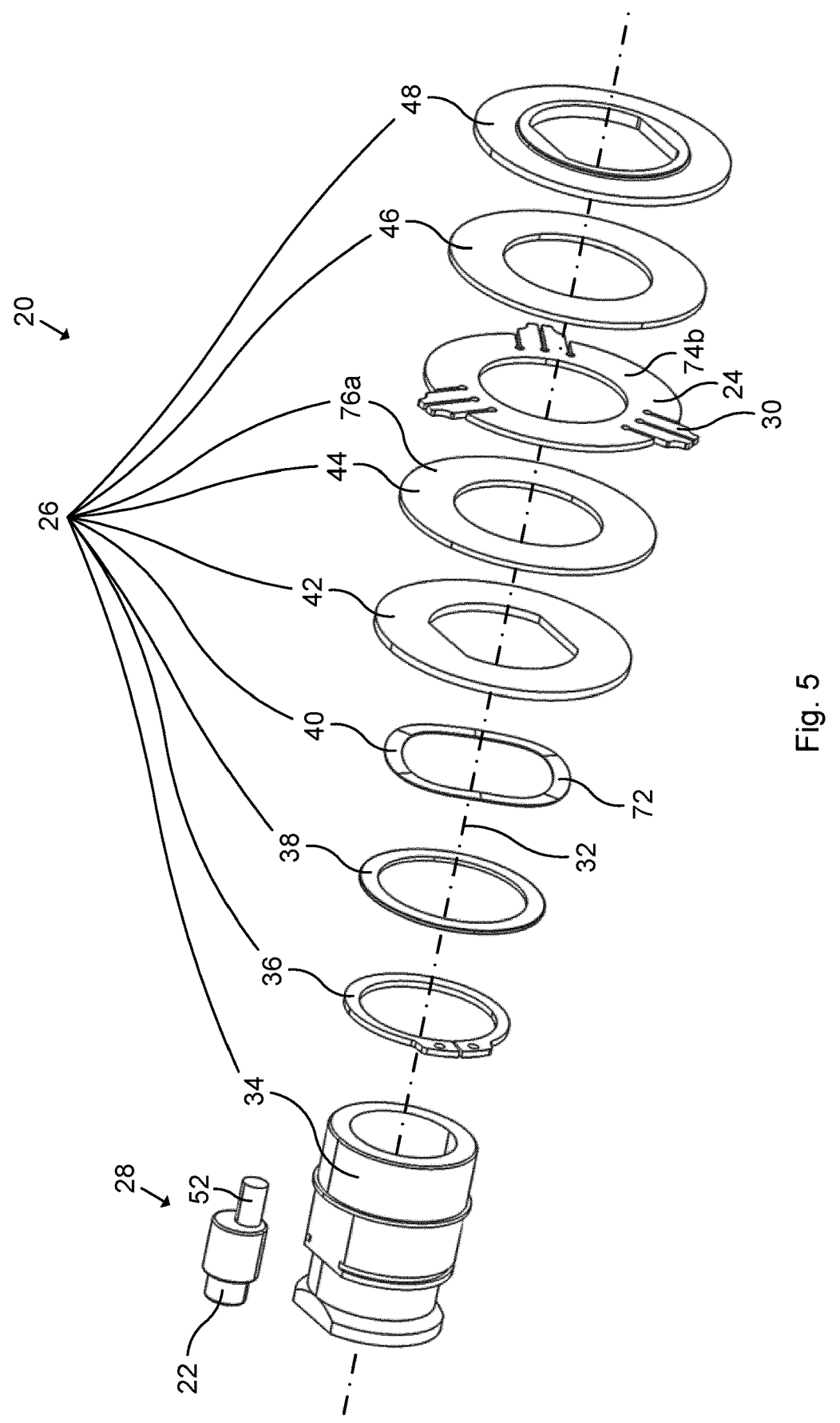
FIG. 5: schematically represents an exploded perspective front view of the brake device.
Figure 6:
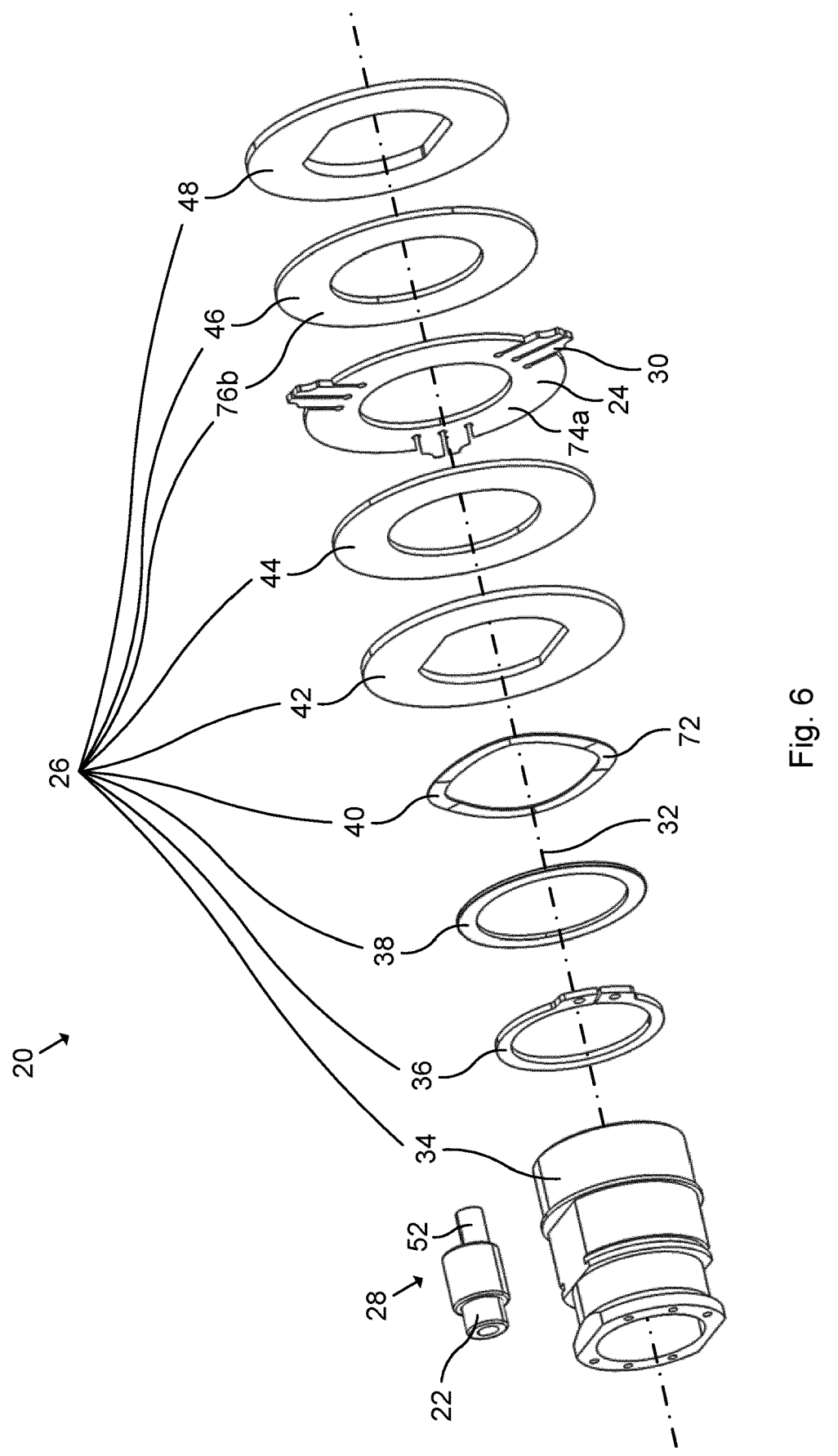
FIG. 6: schematically represents an exploded perspective rear view of the brake device.

FIG. 5 schematically represents an exploded perspective front view of the brake device 20, and FIG. 6 schematically represents an exploded perspective rear view of the brake device 20. With collective reference to FIGS. 5 and 6, the force device 40 is constituted by a spring 72. The spring 72 is deformed by the pressing force 50.

The brake element 24 comprises a primary first frictional brake surface 74a and an opposite secondary first frictional brake surface 74b. The primary friction disc 44 comprises a primary second frictional brake surface 76a and the secondary friction disc 46 comprises a secondary second frictional brake surface 76b.

Each of the primary locking disc 42 and the secondary locking disc 48 comprises a key opening that is rotationally locked to the output shaft 34. In this example, the primary friction disc 44 is fixed to the primary locking disc 42 and the secondary friction disc 46 is fixed to the secondary locking disc 48. The specific topology and configuration of the stack may however be varied. For example, the primary friction disc 44 does not have to be fixed to the primary locking disc 42 and the secondary friction disc 46 does not have to be fixed to the secondary locking disc 48. Thus, rotational interfaces may be provided also between primary locking disc 42 and the primary friction disc 44, and between the secondary friction disc 46 and the secondary locking disc 48. Moreover, an additional brake element having one or more engageable structures may be provided in the stack.

In operation of the brake device 20, the primary second frictional brake surface 76a is in frictional contact with the primary first frictional brake surface 74a, and the secondary first frictional brake surface 74b is in frictional contact with the secondary second frictional brake surface 76b. Since the spring 72 is deformed, and held deformed by the locking mechanism 36, the primary second frictional brake surface 76a is forced against the primary first frictional brake surface 74a, and the secondary first frictional brake surface 74b is forced against the secondary second frictional brake surface 76b.

In a conventional pin brake, a dynamic friction coefficient between the frictional brake surfaces is rather high, such as 0.35 to 0.42. In the brake device 20, a dynamic friction coefficient between the primary second frictional brake surface 76a and the primary first frictional brake surface 74a, and between the secondary first frictional brake surface 74b and the secondary second frictional brake surface 76b is substantially lower, such as less than 0.3, such as less than 0.15, or less than 0.1. This low dynamic friction coefficient can be achieved in various ways, e.g. by material selection and/or by lubrication of the primary second frictional brake surface 76a, the primary first frictional brake surface 74a, the secondary first frictional brake surface 74b and/or the secondary second frictional brake surface 76b. The primary second frictional brake surface 76a, the primary first frictional brake surface 74a, the secondary first frictional brake surface 74b and the secondary second frictional brake surface 76b are here exemplified as made of oiled steel to provide a dynamic friction coefficient of 0.081 and a static friction coefficient of 0.15.

For a given target dynamic braking torque 58, the pressing force 50 has to be increased when the dynamic friction coefficient is lowered. The method of preparing the brake device 20 may therefore comprise determining the desired target dynamic braking torque 58, calculating the dynamic friction coefficient, and setting the pressing force 50 based on the target dynamic braking torque 58 and the dynamic friction coefficient.

Each of the dynamic friction coefficient, the pressing force 50 and an actual dynamic braking torque can be determined and verified by tests in ways known to the skilled person. For example, the pressing force 50 can be determined with the following equation:

$$F = \frac{T_{brake}}{N \times r \times \mu} \tag{1}$$

where F[N] is the pressing force 50, $T_{brake}$[Nm] is the target dynamic braking torque 58, N is the number of pairs of frictional surfaces, r[m] is an average radius of the primary first frictional brake surface 74a and the secondary first frictional brake surface 74b, and μ is the dynamic friction coefficient.

The pressing force 50 can also be determined by replacing the target dynamic braking torque 58 with a target static braking torque, and by replacing the dynamic friction coefficient with a static friction coefficient. By dimensioning the pressing force 50 based on the low dynamic friction coefficient, the desired target dynamic braking torque 58 can be obtained.

Once the brake device 20 has been provided with the dynamic friction coefficient of less than 0.3, and the pressing force 50 has been set to provide the target dynamic braking torque 58 in view of the dynamic friction coefficient, the brake device 20 is installed, e.g. the first device 22 is connected to the base structure 60 and the second device 26 is connected to the driven member 62.

The intentionally low dynamic friction coefficient implies that the dynamic friction coefficient does not change drastically, or does not change at all, in case the lubricant 70 appears between the primary second frictional brake surface 76a and the primary first frictional brake surface 74a, or between the secondary first frictional brake surface 74b and the secondary second frictional brake surface 76b. The primary second frictional brake surface 76a, the primary first frictional brake surface 74a, the secondary first frictional brake surface 74b, the secondary second frictional brake surface 76b and the lubricant 70 may for example be configured such that the dynamic friction coefficient changes less than 2% upon entry of the lubricant 70 between the primary second frictional brake surface 76a and the primary first frictional brake surface 74a, and between the secondary first frictional brake surface 74b and the secondary second frictional brake surface 76b. By means of the low dynamic friction coefficient, the brake device 20 is made substantially less sensitive to entry of various lubricating substances. The brake device 20 therefore provides a significant improvement in terms of safety and reliability over prior art brake devices.

Figure 7:
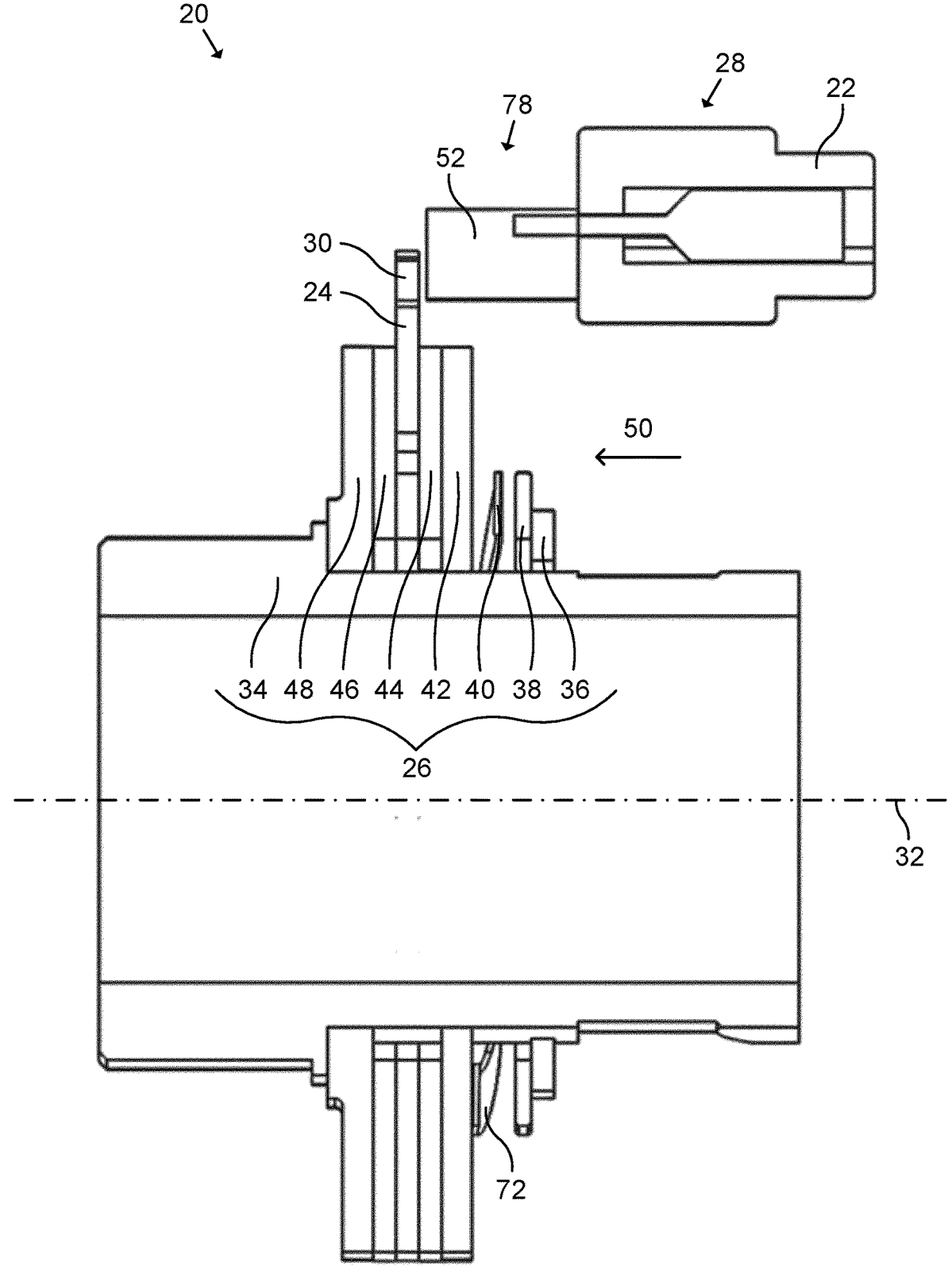
FIG. 7: schematically represents a cross-sectional side view of the brake device in FIGS. 2 to 6 when an actuator pin adopts a disengaged position.

FIG. 7 schematically represents a cross-sectional side view of the brake device 20 when the actuator pin 52 adopts the disengaged position 78. In the disengaged position 78, the actuator pin 52 is retracted away from the brake element 24 and does therefore not engage the engageable structure 30. When electric power is supplied to the actuator 28, the actuator pin 52 moves from the engaged position 54 to the disengaged position 78 against the deformation force of an actuator spring (not shown). The second device 26 is thereby free to rotate about the rotation axis 32. The brake element 24 then rotates together with the second device 26.

Figure 8:
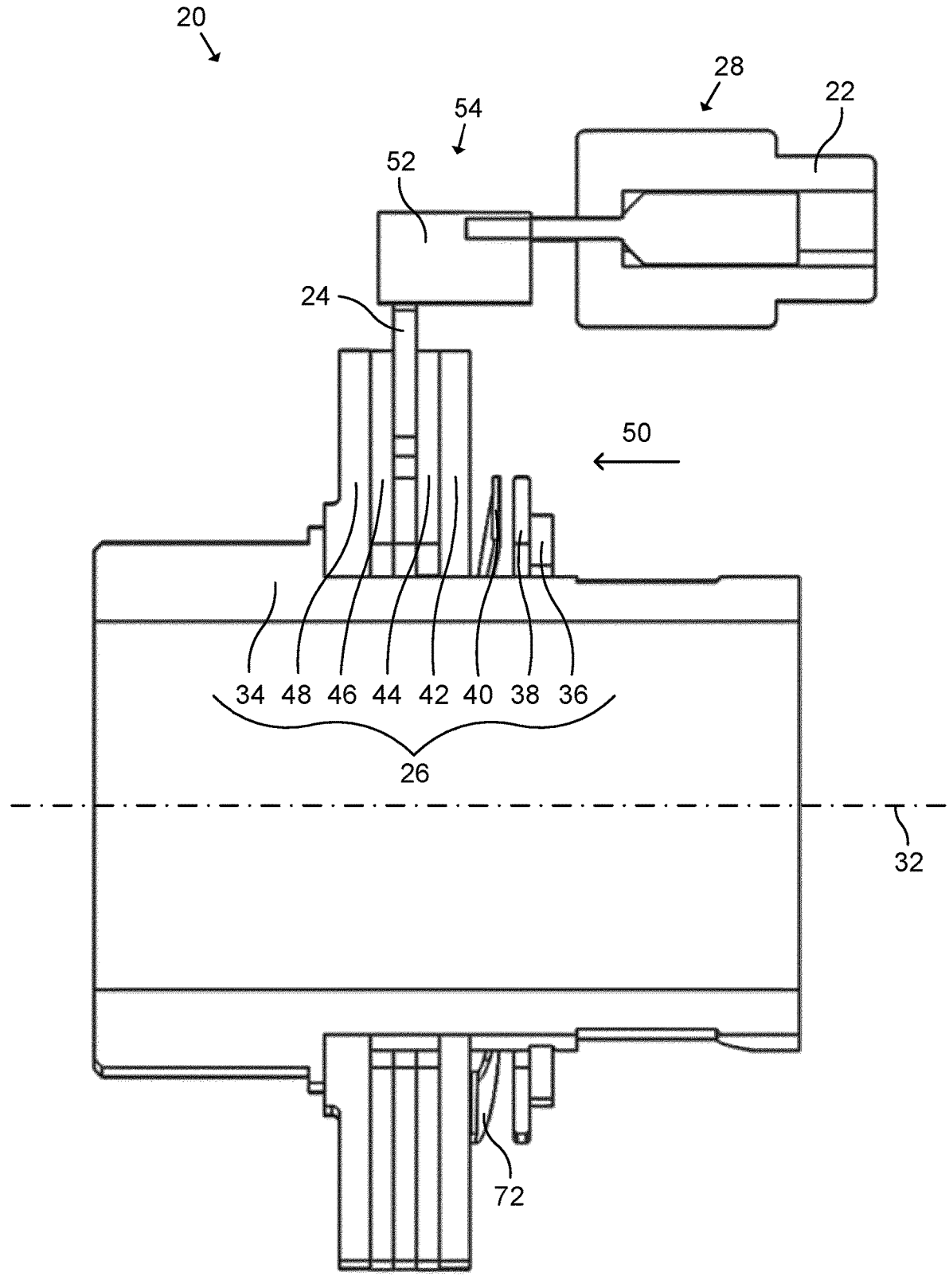
FIG. 8: schematically represents a cross-sectional side view of the brake device in FIGS. 2 to 7 when the actuator pin adopts an engaged position.

FIG. 8 schematically represents a cross-sectional side view of the brake device 20 when the actuator pin 52 adopts the engaged position 54. When electric power ceases to be supplied to the actuator 28, the actuator spring forces the actuator pin 52 to move from the disengaged position 78 to the engaged position 54 in a direction parallel with the rotation axis 32. The actuator 28 is thus a power off actuator.

In the engaged position 54, the actuator pin 52 locks the brake element 24 by engagement with one of the engageable structures 30 such that frictional sliding occurs between the primary second frictional brake surface 76a and the primary first frictional brake surface 74a, and between the secondary first frictional brake surface 74b and the secondary second frictional brake surface 76b. The rotational speed of the second device 26 is thereby frictionally braked.

Figure 9:
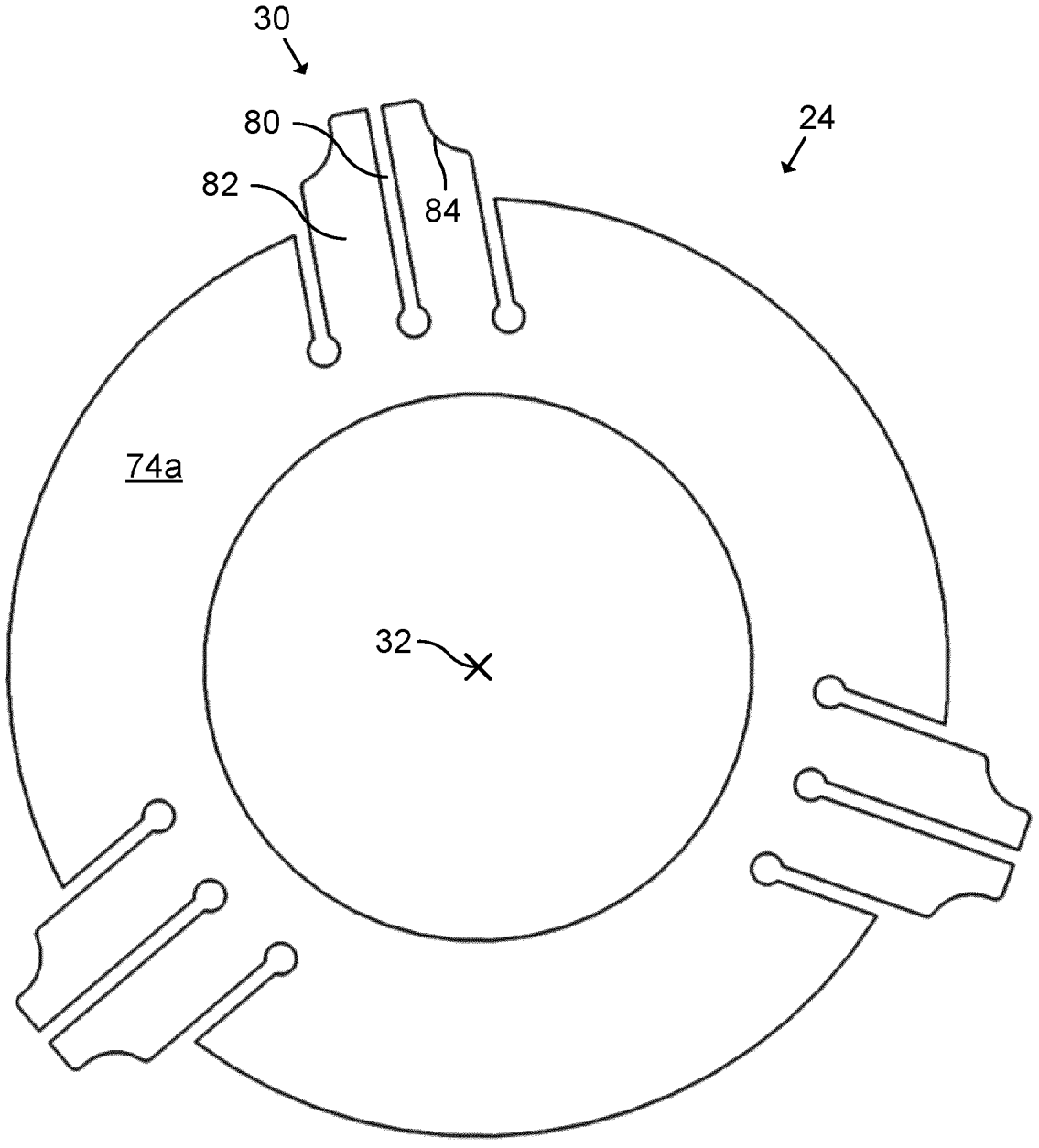
FIG. 9: schematically represents a front view of a brake element of the brake device.

FIG. 9 schematically represents a front view of a brake element 24 of the brake device 20. The brake element 24 in this example is made of a single sheet of steel having a uniform thickness and being oiled to provide the low dynamic friction coefficient.

Each engageable structure 30 comprises three slots 80. The slots 80 are examples of apertures according to the present disclosure. In this example, a middle slot 80 of each engageable structure 30 extends radially with respect to the rotation axis 32 and the two outer slots 80 extend in parallel with the middle slot 80. The slots 80 are open to a radially outer side of the brake element 24. The slots 80 introduce elasticity to the engageable structures 30.

The three slots 80 define two teeth 82 for each engageable structure 30. The teeth 82 extend radially outside the remainder of the brake element 24. Each tooth 82 comprises a curved profile 84 having a round shape corresponding to a curvature of the actuator pin 52. The teeth 82 extend radially outwards with respect to the rotation axis 32. By forming the teeth 82 by cutting slots 80 in the brake element 24, the brake element 24 can be produced quickly and in a very cost-effective manner, e.g. by means of water cutting.

Figure 10:
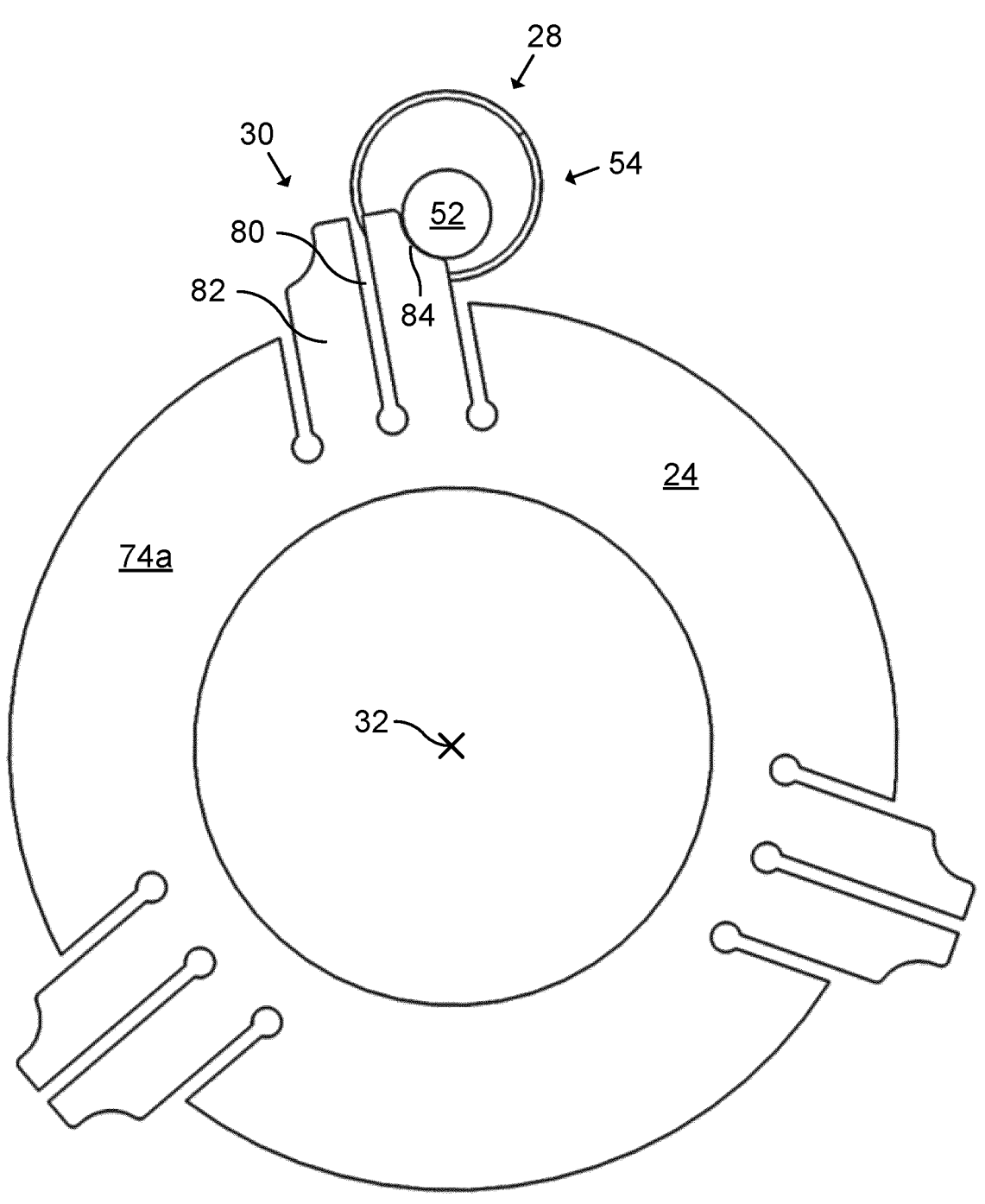
FIG. 10: schematically represents a front view of the brake element and an actuator of the brake device.

FIG. 10 schematically represents a front view of the brake element 24 and the actuator 28 when the actuator pin 52 adopts the engaged position 54. The actuator pin 52 mates with the curved profile 84 of one of the teeth 82. By means of the elasticity of the teeth 82, the actuator pin 52 resiliently and elastically engages the engageable structure 30 when the actuator pin 52 collides with one of the teeth 82. A magnitude of the impact force can thereby be reduced. The tooth 82 resiliently flexes in the plane of the brake element 24. In this example, the brake element 24 is allowed to rotate up to 1.5 degrees about the rotation axis 32 with only elastic deformation of the tooth 82. The resilient engagement between the actuator pin 52 and the engageable structure 30 provides a more robust operation and an increased safety of the brake device 20.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A brake device comprising:
   a first device;
   a brake element having a first frictional brake surface and an engageable structure;
   a second device movable relative to the first device;
   a second frictional brake surface;
   a force device arranged to press the first frictional brake surface and the second frictional brake surface against each other with a pressing force; and
   an actuator connected to the first device, the actuator including an engaging structure movable between a disengaged position, where the engaging structure does not engage the engageable structure, and an engaged position, where the engaging structure engages the engageable structure to brake relative motion between the first device and the second device;
   wherein a dynamic friction coefficient between the first frictional brake surface and the second frictional brake surface is less than 0.3; and
   wherein the pressing force is dimensioned with respect to the dynamic friction coefficient.

2. The brake device according to claim 1, wherein the second device is rotatable relative to the first device about a rotation axis, wherein the brake device is configured to exert a target dynamic braking torque against relative rotation between the first frictional brake surface and the second frictional brake surface, and wherein the pressing force is also dimensioned with respect to the target dynamic braking torque.

3. The brake device according to claim 2, wherein the brake element is flat.

4. The brake device according to claim 2, wherein the engageable structure comprises one or more teeth.

5. The brake device according to claim 2, wherein the force device comprises a spring.

6. The brake device according to claim 1, wherein the brake element is flat.

7. The brake device according to claim 1, wherein the engageable structure comprises one or more teeth.

8. The brake device according to claim 1, wherein the force device comprises a spring.

9. A brake device comprising:

a first device;

a brake element having a first frictional brake surface and an engageable structure;

a second device movable relative to the first device;

a second frictional brake surface;

a force device arranged to press the first frictional brake surface and the second frictional brake surface against each other; and an actuator connected to the first device, the actuator including an engaging structure movable between a disengaged position, where the engaging structure does not engage the engageable structure, and an engaged position, where the engaging structure engages the engageable structure to brake relative motion between the first device and the second device;

wherein the engaging structure and/or the engageable structure is configured such that the engaging structure resiliently engages the engageable structure when the engaging structure adopts the engaged position.

10. The brake device according to claim 9, wherein the engageable structure comprises one or more apertures contributing to the resilient engagement.

11. The brake device according to claim 10, wherein each aperture is a slot extending substantially in a radial direction with respect to the rotation axis.

12. The brake device according to claim 10, wherein the second device is rotatable relative to the first device about a rotation axis.

13. The brake device according to claim 10, wherein each aperture is a slot extending substantially in a radial direction with respect to the rotation axis.

14. The brake device according to claim 9, wherein the second device is rotatable relative to the first device about a rotation axis.

15. The brake device according to claim 14, wherein the brake device is configured such that the brake element can rotate at least 0.5 degrees about the rotation axis during the resilient engagement between the engaging structure and the engageable structure.

16. An industrial robot comprising a brake device having:

a first device;

a brake element having a first frictional brake surface and an engageable structure;

a second device movable relative to the first device;

a second frictional brake surface;

a force device arranged to press the first frictional brake surface and the second frictional brake surface against each other with a pressing force; and an actuator connected to the first device, the actuator including an engaging structure movable between a disengaged position, where the engaging structure does not engage the engageable structure, and an engaged position, where the engaging structure engages the engageable structure to brake relative motion between the first device and the second device;

wherein a dynamic friction coefficient between the first frictional brake surface and the second frictional brake surface is less than 0.3; and wherein the pressing force is dimensioned with respect to the dynamic friction coefficient.

17. A method of preparing a brake device, the method comprising:

providing a brake device having:

a brake element having a first frictional brake surface and an engageable structure;

a second device movable relative to the first device;

a second frictional brake surface;

a force device arranged to press the first frictional brake surface and the second frictional brake surface against each other with a pressing force; and an actuator connected to the first device, the actuator including an engaging structure movable between a disengaged position, where the engaging structure does not engage the engageable structure, and an engaged position, where the engaging structure engages the engageable structure to brake relative motion between the first device and the second device;

wherein a dynamic friction coefficient between the first frictional brake surface and the second frictional brake surface is less than 0.3; and dimensioning the pressing force based on the dynamic friction coefficient.

18. The method according to claim 17, wherein the second device is rotatable relative to the first device about a rotation axis, and wherein the method further comprises:

determining a target dynamic braking torque of the brake device; and dimensioning the pressing force based on the target dynamic braking torque.

19. The method according to claim 17, further comprising connecting the first device of the provided brake device to a base structure; and connecting the second device of the provided brake device to a driven member.

* * * * *